United States Patent [19]
De Haan et al.

[11] Patent Number: 5,880,791
[45] Date of Patent: Mar. 9, 1999

[54] METHOD AND APPARATUS FOR FILTERING DATA IN WHICH THE REQUIRED STORAGE CAPACITY IS REDUCED

[75] Inventors: Gerard De Haan; Robert J. Schutten, both of Eindhoven, Netherlands

[73] Assignee: U.S. Philips Corporation, New York, N.Y.

[21] Appl. No.: 734,274

[22] Filed: Oct. 21, 1996

[30] Foreign Application Priority Data

Oct. 20, 1995 [EP] European Pat. Off. ............. 95202847

[51] Int. Cl.$^6$ ..................................................... H04N 5/21
[52] U.S. Cl. ........................... 348/607; 348/619; 348/620
[58] Field of Search .................... 348/607, 616, 348/617, 618, 619, 620, 621, 624, 909, 625, 630, 606; 382/260; 364/724.011; H04N 5/21, 5/213

[56] References Cited

FOREIGN PATENT DOCUMENTS

| 0581059A3 | 7/1993 | European Pat. Off. . |
| 0581059 | 2/1994 | European Pat. Off. . |
| 9516322 | 6/1995 | WIPO . |

*Primary Examiner*—Sherrie Hsia
*Attorney, Agent, or Firm*—Steven R. Biren

[57] ABSTRACT

In a method of filtering data, including the steps of processing (7) data (O) to obtain reduced data, delaying (9) the reduced data to obtain delayed data, interpolating (11, 13) the delayed data to obtain interpolated data (R), and combining (1–5) the interpolated data (R) and input data (I) to obtain filtered data (O), the interpolating step (11, 13) includes the step (13) of providing one delayed data element out of several delayed data elements in dependence upon an input data element (p).

9 Claims, 1 Drawing Sheet

METHOD AND APPARATUS FOR FILTERING DATA IN WHICH THE REQUIRED STORAGE CAPACITY IS REDUCED

BACKGROUND OF THE INVENTION

The invention relates to a method and apparatus for filtering data. Preferably, the invention is used in an image data noise filter. The invention also relates to a television receiver comprising such a noise filter.

EP-A-0,581,059 discloses a method of filtering noise in television or video signals by means of a noise reduction circuit having a first input which receives the input signal, and a second input which receives a low-frequency part of a field delayed output signal of the noise reduction circuit. A decimation filter is present between an output of the noise reduction circuit and the field delay to reduce the data rate of the output signal of the noise reduction circuit. More specifically, the bandwidth is reduced by a factor 2, the data rate is reduced by the same factor, and the bit resolution is reduced from 8 bits to 7 bits. An interpolation filter is present between the field delay and the second input of the noise reduction circuit. The presence of the decimation filter and the interpolation filter allows the use of a field delay with a reduced storage capacity. When it is attempted to obtain a further reduction of the required storage capacity, disturbing artifacts occur when the prior art techniques are used.

SUMMARY OF THE INVENTION

It is, inter alia, an object of the invention to provide an improved data filtering in which a further reduction of the required storage capacity is obtained without disturbing artifacts. To this end, a first aspect of the invention provides a method in which an interpolation step includes the steps of providing one delayed data element out of several delayed data elements in dependence upon the data input.

In accordance with a preferred embodiment, the invention provides a method of filtering data, comprising the steps of processing data to obtain reduced data, delaying the reduced data to obtain delayed data, interpolating the delayed data to obtain interpolated data, and combining the interpolated data and input data to obtain filtered data, in which the interpolating step includes the step of providing one delayed data element out of several delayed data elements in dependence upon the input data.

These and other aspects of the invention will be apparent from and elucidated with reference to the embodiments described hereinafter.

DESCRIPTION OF THE PREFERRED EMBODIMENT

Processing of video signals often requires that the video signal of a previous line, field or frame is known. This means that elements to provide for the required delay, like line, field and frame memories, are needed. When the memory is used for some type of processing that only requires the lower frequency contents of the delayed signal (for example, noise filtering), the contents of the memories can be subsampled, as described in EP-A-0,581,059. Before subsampling there generally is a low-pass filter and after the subsampled memory there generally is an interpolating filter.

When, in accordance with an embodiment of the present invention, the subsampling frequency is deliberately chosen below the Nyquist criterion, there is not enough information available in the delayed subsampled signal to successfully reconstruct the original signal. The additional information needed for reconstruction can be obtained from the undelayed current signal.

The idea is to use information in the undelayed current signal to help reconstruct the information of the delayed signal. More specifically, a few interpolation candidates are computed from the delayed subsampled signal, and the candidate that has the smallest absolute difference from a reference pixel in the undelayed current signal is chosen as the interpolated pixel of the delayed signal.

Figure 1:
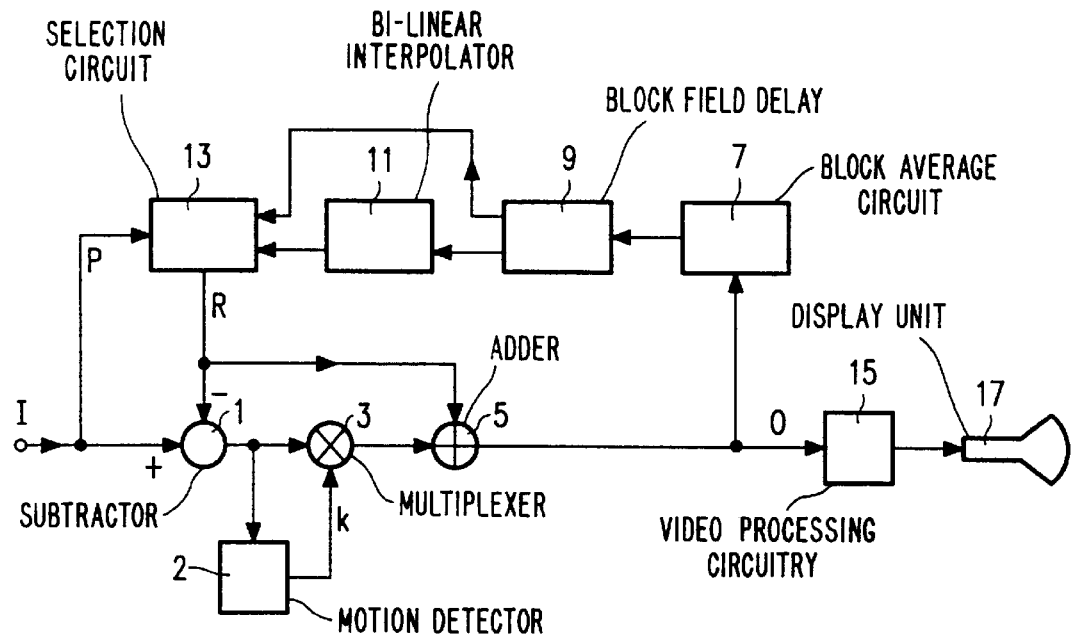
FIG. 1 shows an embodiment of a television receiver comprising a first order temporal subsampled recursive motion adaptive noise filter in accordance with the present invention.

The amount of memory needed for a first order temporal recursive motion adaptive noise filter can be reduced by replacing the prior art field memory on a pixel base with a subsampled field memory on a block base, see FIG. 1. In FIG. 1, an input video signal I is applied to a subtracter 1, a second input of which receives a reconstructed delayed signal R. An output signal of the subtracter 1 is applied to a motion detector 2 to obtain a motion signal k by which the output signal of the subtracter 1 is multiplied in a multiplier 3. An output signal of the multiplier 3 is added to the reconstructed delayed signal R by an adder 5 to obtain a noise reduced output signal O. The noise reduced output signal O is applied to further video signal processing circuitry 15 (e.g. brightness and contrast adjustments, amplification etc.), the output of which is applied to a display unit 17.

Figure 2:
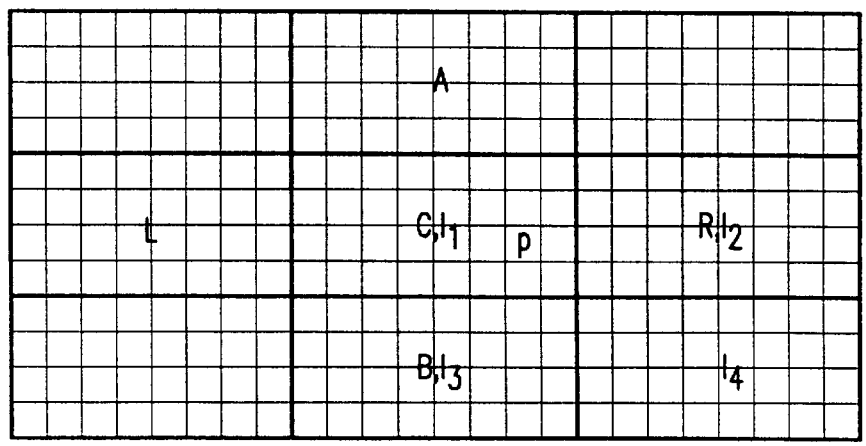
FIG. 2 illustrates positions of blocks and pixels in a non-linear interpolation in accordance with an embodiment of the present invention.

In the noise filter, the noise reduced output signal O is applied to a block average circuit 7 for determining one average value for each block of 4×8 pixels as illustrated in FIG. 2. In FIG. 2, the fat lines and the uppercase symbols indicate blocks, while the thin lines indicate pixels. An output of the block average circuit 7 is applied to a block field delay 9, which supplies several delayed data elements to a bi-linear interpolator 11.

Thus, the block field delay 9 stores only the average of blocks of pixels in the field. The block size is, for example, 4 lines vertically by 8 pixels horizontally. This yields a data reduction by a factor 32, which is much larger than in the prior art. To restore the field at the original sample rate, a bi-linear interpolation is used. However, when the output signal of the bi-linear interpolator 11 is used as the reconstructed video signal R, visible artifacts close to the edges in the original image become visible. This is caused by the absence of high frequencies in the interpolated subsampled signal, i.e. the edges resulting from the interpolated subsampled field memory are 'softened'. The strength of the motion adaptive non-linear filtering relies on the difference between both inputs. Because of the 'soft' edge from the field memory, this difference will increase close to the edge. This in turn will locally decrease the strength of the noise filtering. So, the noise filtering applied to the combination of the large bandwidth input signal and the low frequency field delayed signal results in a visible breakthrough of noise close to sharp edges in the output image.

In accordance with the present embodiment of the current invention, the bi-linear interpolator 11 is augmented by a non-linear filter that is able to choose between several interpolation candidates in order to decrease the local differences. To this end, several delayed data elements from the block field delay 9 are applied to a selection circuit 13. The bi-linear interpolator 11 supplies an interpolated data element to the selection circuit 13. The selection circuit 13 also receives an input data element from the input video signal I, for example, the currently received pixel p. The selection circuit 13 selects one of the data elements received from the block field delay 9 and the bi-linear interpolator 11 in dependence upon the input data element p. More specifically, the data element which shows the smallest absolute difference to the input data element p is supplied as a reconstructed data element R to the subtracter 1 and the adder 5.

So, in accordance with the preferred embodiment, the criterion for best candidate is the absolute difference between the candidate and a reference pixel. The reference pixel is the pixel at the current position in the undelayed current image. Besides a bi-linearly interpolated data element from the interpolator 11, the non-linear interpolation filter (selection circuit 13) has four additional inputs. These are the values of four surrounding blocks received from the block field delay 9. These blocks are above A, below B, left L and right R of the current block C which is the block where the current pixel p belongs to. The current block C is represented by the bi-linear interpolation of the subsampled field delay 9, which bi-linear interpolation is computed with blocks I1=C, I2=R, I3=B, and I4, as illustrated in FIG. 2.

It should be noted that the above-mentioned embodiments illustrate rather than limit the invention, and that those skilled in the art will be able to design many alternative embodiments without departing from the scope of the appended claims. In the embodiment, mean values are stored in the delay. Other representative values, such as median values or simply one (subsampled) value out of a group of input values may be stored instead of mean values. In the embodiment, the reference pixel on which the selection depends is formed by the currently received pixel p. Alternatively, the reference pixel may have undergone some low-pass filtering operation in other to obtain a smoother switching behavior. In the embodiment, one delayed data element is selected out of several delayed data elements. A softer selection is also possible, in which the provided data element is the result of a weighted filtering on the delayed data elements, with weights depending on the absolute differences between the delayed data elements and the reference pixel. While the embodiment shows a field delay, other delays as a line delay or a frame delay are possible as well. When a line delay is used, the data elements stored are representative of respective groups of adjacent pixels on a line. It is not necessary that in each line, groups at the same horizontal positions are taken to compute a representative value; the representative values stored in the line delay may be taken from groups which are shifted in the horizontal direction from line to line so as to form a kind of quincunx subsampling pattern. Such a shift from line to line results in a reduced number of artifacts. A less regular pattern is also possible: for example, when one out of eight samples is stored, a line alternating horizontal position shift of +2 and −2 samples yielded good results in reducing artifacts. Instead of blocks of 4×8 pixels, other block sizes are possible as well when two-dimensional groups are reduced to one representative value. Again, the block boundaries do not need to be at the same horizontal positions throughout the field. Other delayed representative values may be supplied to the selection circuit 13 in addition to or instead of the four values A, B, L, R. Instead of a bi-linear interpolation, another interpolation algorithm may be used. The combining arrangement 1, 3, 5 may be replaced by a first multiplier for multiplying the input signal I by k, a second multiplier for multiplying the reconstructed signal R by 1-k, and an adder for summing both multiplication results. The embodiment of FIG. 1 shows a very simple combination of delayed and input signals, viz. one input sample p is combined with one sample from the reconstructed signal R. It goes without saying that more sophisticated combinations are also possible, for example that shown in WO-A-95/16322 in which 3 input samples and 5 delayed samples are combined, in which basically only those samples are taken into account which differ less than a given threshold from the current input sample. In the claims, any reference signs placed between parentheses shall not be construed as limiting the claim. The invention can be implemented by means of hardware comprising several distinct elements, and by means of a suitably programmed computer.

In brief, in accordance with an embodiment of the invention it is proposed to subsample the required field memory in order to reduce the cost of a first order temporal recursive motion adaptive noise filter. To reconstruct the picture content after the subsampling it is suggested to use a non-linear interpolation. The non-linear interpolation chooses the best of a set of interpolation candidates. The criterion for best candidate is the minimum of the absolute difference between the candidate and the reference pixel. The reference pixel is the pixel at the current position in the undelayed current image. This will give better performance when compared with a bi-linear interpolation of the subsampled field memory.

What is claimed is:

1. A method of filtering data, comprising the steps of:
processing (7) filtered data (O) to obtain reduced data;
delaying (9) said reduced data to obtain delayed data;
interpolating (11, 13) said delayed data to obtain interpolated data (R);
and
combining (1–5) said interpolated data (R) and input data (I) to obtain the filtered data (O);
characterized in that:
said interpolating step (11, 13) includes the step (13) of providing one delayed data element out of several delayed data elements (A, B, C, L, R) in dependence upon said input data (I).

2. A method as claimed in claim 1, wherein at least one (C) of said delayed data elements (A, B, C, L, R) is obtained by means of a bi-linear interpolation (11) based on a plurality of said delayed data elements (I1–I4).

3. A method as claimed in claim 1, wherein said providing step (13) includes the steps of determining absolute differences between each of said several delayed data elements (A, B, C, L, R) and an input data element (p), and supplying the delayed data element (A, B, C, L, R) having the smallest absolute difference to said input data element (p) as said interpolated data (R).

4. A method as claimed in claim 3, wherein said delayed data (A, B, C, L, R) elements have a smallest absolute difference from said input data element (p) in the horizontal and/or vertical direction.

5. A method as claimed in claim 1, wherein said input data (I) on which said providing step (13) depends has undergone a filtering operation.

6. A method as claimed in claim 1, wherein said processing step (7) includes the step of subsampling said data in a pattern which is horizontally shifted between subsequent lines.

7. A method as claimed in claim 1, wherein said providing step (13) involves a weighted filtering on said delayed data elements (A, B, C, L, R), with weights depending on said input data (I).

8. An apparatus for filtering data, comprising:
- means for processing (7) filtered data (O) to obtain reduced data;
- means for delaying (9) said reduced data to obtain delayed data;
- means for interpolating (11, 13) said delayed data to obtain interpolated data (R); and
- means for combining (1–5) said interpolated data (R) and input data (I) to obtain the filtered data (O);

characterized in that:
- said interpolating means (11, 13) include means (13) for providing one delayed data element out of several delayed data elements (A, B, C, L, R) in dependence upon said input data (I).

9. A television receiver, comprising:
- a data filtering apparatus as defined in claim 8;
- video signal processing means (15) for processing the filtered data (O) to obtain a display signal; and
- a display unit (17) for displaying the display signal.

* * * * *